Patented Feb. 3, 1948

2,435,501

UNITED STATES PATENT OFFICE 2,435,501

ACENAPHTHENEDIONE AS PARASITICIDAL PREPARATIONS

Elbert C. Ladd, Passaic, N. J., assignor to United States Rubber Company, New York, N. Y., a corporation of New Jersey No Drawing. Application August 5, 1944, Serial No. 548,300

9 Claims. (Cl. 167—30)

This invention relates to new and useful improvements in parasiticidal preparations, more particularly to germicides, that is, fungicides and bactericides. The invention further relates to methods of treating plants, and to methods of protecting organic material subject to attack by microorganisms, as the immunizing of seed, and the mildewproofing of fabrics and other material.

I have found that acenaphthenedione is an effective fungicide and bactericide. The structure of the compound may be represented as follows:

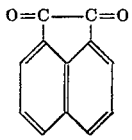

The compound and method of preparation are described in Beilstein's "Handbuch der Organischen Chemie," vol. 7, page 744 (4th ed.).

Acenaphthenedione may be used as a seed protectant and to protect plants, which term includes plant parts, or soil from organisms harmful to seeds and plants. It may also be applied to prevent or retard fungus growth and the formation of, for example, mildew on organic material such as rope, wood, fur, hair, feathers, cotton, wool, leather, paints, varnishes, and the like. Acenaphthenedione may be applied as a dust, undiluted or mixed with a solid carrier, such as clay or talc, or as a spray in a liquid carrier, as in solution in a suitable solvent, or suspended in a suitable non-solvent medium, for example, water. It may be applied mixed with an active carrier, for example, other germicides, or insecticides, insect repellents, fertilizers, hormones, buffering or safening agents.

The following examples are given to illustrate the invention:

Example I

Pea seed, variety Perfection, were tumbled with various amounts of acenaphthenedione in dust form, as shown in the table below. The seeds were then planted in soil known to be infested with a number of organisms, including *Pythium ultimum*. The effectiveness of the chemical as a fungicide was determined by comparing the number of treated and untreated seeds which germinated into healthy plants from equal numbers of treated and untreated seeds planted under the same conditions. The results were as follows:

| Per cent Acenaphthenedione Based on Seed Weight | Per cent Seed Germination after Ten Days | |
|---|---|---|
| | Treated | Untreated |
| 1 | 94 | 11 |
| .125 | 61 | 6 |

Example II

Tomato plants with four to six fully expanded leaves were sprayed for 20 seconds at 20 lbs. per sq. in. pressure with aqueous suspensions (prepared with a small amount of commercial dispersing agent) of 2000 and 200 parts per million respectively of acenaphthenedione. After drying overnight in the greenhouse, the treated plants, together with some untreated plants, were sprayed for 20 seconds at 20 lbs. per sq. in. pressure with an aqueous suspension of spores of *Alternaria solani* containing approximately 25,000 spores per cubic centimeter. The plants were then set in an incubation chamber at 75° F. and 100% humidity for 24 hours. The plants were then removed to the greenhouse and held on the greenhouse bench for ten days. The number of lesions were then counted on the leaves of the plants. The average number of lesions per plant not treated with the chemical was 194. The number of lesions on the plants treated with the suspension of 2000 P. P. M. (parts per million) of the chemical was 28, giving 86% control and with 200 P. P. M. was 75, giving 62% control.

Example III

In slide tests, using the "slide technique" described by S. E. A. McCallan et al., Contributions Boyce-Thompson Institute 4, 233 (1932); 9, 249 (1938); 10, 329 (1939); 12, 49 (1941); 12, 431 (1943), ten parts of acenaphthenedione per million parts of water gave 100% control of the spores of the fungi *Sclerotinia americana* and *Alternaria solani*.

Example IV

This example illustrates the effectiveness of acenaphthenedione as a fungicide for protecting textiles, such as cotton goods, from attack by cellulose-decomposing organisms, such as *Chaetomium globosum*.

A piece of cotton fabric was dipped into a 2% by weight solution of acenaphthenedione in acetone and then was dried to completely remove the acetone. The sample was then inoculated with *Chaetomium globosum* spore suspension and incubated on agar medium. An untreated piece of cotton fabric was inoculated with the *Chaetomium globosum* spore suspension and incubated at the same time. At the end of an incubation period of 30 days, it was observed that no fungus growth had appeared on the sample treated with acenaphthenedione. The sample that was not treated with acenaphthenedione was heavily overgrown with fungus at the end of nine days.

Example V

This case illustrates the effectiveness of acenaphthenedione as a bactericide. 5% by weight of acenaphthenedione was suspended in water which contained 2% of Emulphor EL (believed to be the reaction product of a fatty acid or a fatty acid ester with ethylene oxide) as a dispersing agent. Pieces of diced carrot were immersed in this suspension and allowed to stand at room temperature. No growth of naturally occurring bacteria was observed after 30 days. On the other hand, pieces of diced carrot treated in a similar way with a 2% solution of Emulphor EL in water, which solution did not contain a germicide, became heavily overgrown with naturally occurring bacteria within the same period of time.

Having thus described my invention, what I claim and desire to protect by Letters Patent is:

1. A fungicidal preparation comprising acenaphthenedione as an active ingredient in an aqueous suspension containing a dispersing agent.

2. A germicidal preparation comprising acenaphthenedione and a carrier therefor selected from the group consisting of powdered solid carriers, and water containing a dispersing agent.

3. The method which comprises treating plants with acenaphthenedione.

4. The method of protecting organic materials subject to attack by microorganisms which comprises treating said organic material with acenaphthenedione.

5. The method of controlling fungi on plants which comprises treating plants with acenaphthenedione.

6. The method of protecting seeds, plants and soil subject to attack by fungi which comprises treating said material with acenaphthenedione.

7. The method of protecting seed against attack by microorganisms which comprises treating said seed with acenaphthenedione.

8. The method of controlling fungi on living organisms which comprises treating said organisms with acenaphthenedione.

9. The method of controlling mildew on organic material which comprises treating said organic material with acenaphthenedione.

ELBERT C. LADD.

REFERENCES CITED

The following references are of record in the file of this patent:

UNITED STATES PATENTS

| Number | Name | Date |
|---|---|---|
| 2,022,231 | Cislak | Nov. 26, 1935 |

OTHER REFERENCES

Chem. Abstracts, 1943, page 5717, by Buu Hoi et al.

Chem. Abstracts, 1942, pages 1341 and 1342 by Garaudian et al.

Beilstein, Handbuch der Organischen Chemie, vol. 7, 4th ed., page 744; vol. 17, page 615, 4th ed.